United States Patent Office 2,882,311
Patented Apr. 14, 1959

2,882,311

PRODUCTION OF ORGANIC PHOSPHONYL HALIDE

Jack Kwiatek, North Arlington, N.J., assignor to The M. W. Kellogg Company, Jersey City, N.J., a corporation of Delaware No Drawing. Application June 28, 1954
Serial No. 439,858

22 Claims. (Cl. 260—543)

The present invention relates to a new and novel method for the production of organic phosphonyl halides. In one aspect this invention relates to a novel method for the production of alkane phosphonyl halides including both the acyclic and alicyclic alkane phosphonyl halides and derivatives derived therefrom. In a more particular aspect this invention relates to a new and novel process for the production of organic phosphonyl dihalides and derivatives derived therefrom, such as the corresponding phosphonic acids, esters, amides, etc. In another particular aspect this invention relates to a new method of production of methane phosphonyl dichloride.

The organic phosphonyl halides and especially methane phosphonyl dichloride are much in demand as intermediate chemical reactants for the production of more complex organic phosphorus-containing compounds, such as the corresponding esters, free acids and amides by conventional methods. The organic phosphonyl halides and their derivatives are useful as fungicides, insecticides and pharmaceuticals. Because of their great chemical stability, the alkane phosphonic acids and esters in particular are valuable not only for these uses but are also useful in other technological applications, for example, as plasticizers, flameproofing agents for textiles, petroleum additives to improve the stability and quality of lubricating oils at high temperatures, water repellents, antioxidants and polymer additives.

The present day methods for producing organic phosphonyl halides and especially methane phosphonyl dichloride are round about and involve numerous reactants and mechanical steps. The less involved methods, although satisfactory for the production of higher molecular weight alkane phosphonyl halides are unsatisfactory for the production of the lower molecular weight alkanes. Whereas saturated hydrocarbons of the order $C_5$ and higher have been reacted with the phosphorus trichloride in the presence of oxygen to yield the corresponding alkane phosphonyl halide in fair yields, the lower molecular weight hydrocarbons, such as methane and propane, react under the same conditions to give extremely poor yields of the corresponding alkane phosphonyl halide.

It is therefore an object of the present invention to provide a new and novel method for the production of organic phosphonyl halides.

Another object is to provide a new and novel method for the production of acyclic and alicyclic alkane phosphonyl halides, such as the organic phosphonyl halides containing between 1 and 10 carbon atoms per molecule arranged in a continuous carbon skeleton.

A further object is to prepare organic phosphonyl halides from starting materials which are obtained from same processes as by-products.

Another object is to provide a simple and direct method for the production of organic phosphonyl dihalides in higher yields than heretofore obtained.

A still further object is to provide a new direct and economical process for the production of methane phosphonyl dichloride.

Various other objects and advantages of the present invention will become apparent to those skilled in the art from the accompanying description and disclosure.

According to the present invention an alkoxy dihalophosphine and an organic halide having only a continuous carbon skeleton are reacted together under substantially anhydrous conditions at a temperature between about 125° C. and about 325° C. to produce an organic phosphonyl dihalide as a product of the process. The organic phosphonyl dihalide produced in accordance with this invention has the general formula,

where R is linked to the phosphorus atom through a carbon to phosphorus bond and where R is an organic radical preferably an alicyclic or acyclic alkyl radical containing only a continuous carbon skeleton and no more than 10 carbon atoms, and X is any of the halogens (Br, Cl, I, F) and the X's may be the same or different halogen atoms. The process of this invention is represented by the following typical illustrative equation:

(1)
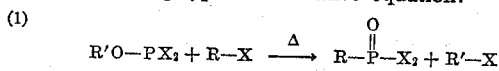

where $R'O-PX_2$ is the general formula for the alkoxy dihalophosphine reactant and R—X is the general formula for the organic halide reactant and where R' and R are organic radicals having only a continuous carbon skeleton and may be the same or different radicals and X is any of the halogens (Br, Cl, I, F) and may be the same or different halogen atoms. The main product of the reaction is the organic phosphonyl dihalide resulting from the alkylation of the phosphorus atom of the alkoxy dihalophosphine with the organic radical of the organic halide, R—X. It is noteworthy that when R and R' are different,

is sometimes formed in less amount as a by-product in addition to the R'—X by-product. However, when R and R' are the same organic radicals then the formation of

during the course of the reaction represents an additional production of organic phosphonyl dihalide product,

The organic phosphonyl dihalide product is recovered directly from the reaction mixture by conventional methods, such as by distillation, or is reacted with other compounds to form derivatives thereof and the derivatives recovered.

The organic halides (R—X) used in accordance with this invention are preferably the alkyl halides containing a continuous carbon skeleton that is, with each of the carbon atoms contained in the R radical attached together,

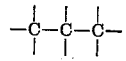

with no atoms such as oxygen and nitrogen separating any two carbon atoms. The preferable types of such alkyl halides are the acyclic and alicyclic halides containing between 1 and 10 carbon atoms per molecule and include the substituted alkyl halides containing only a continuous carbon skeleton. Typical examples of the unsubstituted alkyl halides which are employed are methyl iodide, methyl chloride, ethyl bromide, isopropyl fluoride, isoamyl chloride, dodecyl chloride, 3-methylhexyl bromide, cyclohexyl iodide, and 4-ethylcyclohexyl bromide.

It has been found that in addition to the unsubstituted alkyl halides the alkyl halides having one or more hydrogen atoms substituted with a corresponding number of halogen atoms react with alkoxy dihalophosphines to give satisfactory yields of organic phosphonyl halides. Such alkyl halides are exemplified by the following: carbon tetrachloride, carbon tetrabromide, perchloropropane, hexachlorocyclohexane, 1,1-difluoro-1,2,2-trichloroethane, and 1-chloro-4-bromocyclo-hexane. When employing alkyl halides in which the halogen atoms are different, the halogen which forms the more stable bond with carbon will be the one found in the organic radical (R) of the final product. For example: 1-iodo-2-chloro-ethane will react under the conditions of the present invention to produce 2-chloroethane phosphonyl dihalide and alkyl iodide will be formed as a by-product.

Other types or organic halides containing only a continuous carbon skeleton are useful in accordance with this invention, such as the aryl substituted alkyl halides, typical examples of which are: benzyl iodide, benzotrichloride, and p-ethylbenzyl chloride; the unsaturated alkyl halides, such as allyl bromide, hexachloropropene-2-hexachlorocyclopentadiene-1,3 in which at least one halogen is attached to a carbon atom not involved in the olefinic unsaturation; and the aromatic halides in which the halogen linked to the aromatic ring is activated by a nitro group with preferably at least two in the ortho and para positions of the ring, such as in 2,4-dinitrochlorobenzene.

Equation 1 above indicates that the source of the organic radical in the final product is the organic halide reactant and not the alkoxy dihalophosphine. Theoretically it is desirable to employ an alkoxy dihalophosphine (R'O—PX$_2$) in which the organic radical (R') is the same as that of the organic halide (R—X) in order to ensure the maximum utilization of reactants and the minimum formation of by-products. For example, the reaction between ethoxy dichlorophosphine and ethyl iodide can lead only to the formation of ethane phosphonyl dichloride under the conditions described herein, thus providing a maximum yield of product. Although ethane phosphonyl dichloride may be produced by the reaction between methoxy dichlorophosphine and ethyl chloride, small yields of methane phosphonyl dichloride are also formed. The latter compound may be separated from the main product, however, by fractional distillation. Inasmuch as good yields of product are obtained by using alkoxy dihalophosphines in which the organic radical is different from that of the organic halide reactant, the use of reactants in which the organic radicals are the same is not always justified. Typical examples of suitable alkoxy dihalophosphines which are useful are methoxy dichlorophosphine, methoxy difluorophosphine, ethoxy dichlorophosphine, ethoxy difluorophosphine, propoxy dichlorophosphine, isobutoxy difluorophosphine, benzyloxy dichlorophosphine, and 2-bromoethoxy dibromophosphine. The simple alkoxy dihalophosphines in which the organic radical is an alkyl group, such as methyl, ethyl and propyl, are the particularly preferred ones to use inasmuch as these compounds are inexpensive, readily prepared, and the resulting alkyl halides (R'—X) formed are readily removed from the reaction mixture by virtue of their volatility.

The alkoxy dihalophosphines are obtained by the addition of an appropriate alcohol to a moderate excess of phosphorus trihalide, mild warming being necessary for the production of such compounds from the higher molecular weight alcohols.

As stated previously, organic phosphonyl dihalides are produced in accordance with this invention by a process which comprises reacting under anhydrous conditions an alkoxy dihalophosphine and an alkyl halide, the main product resulting in general from the alkylation of the phosphorus atom with the alkyl group of the alkyl halide reactant. Except when an alkyl iodide is used, it is most desirable to employ an alkyl halide (R—X) and an alkoxy dihalophosphine (R'O—PX$_2$) in which the X's are the same halogen atoms thereby avoiding the formation of a mixture or organic phosphonyl dihalide products. For example, when using an alkyl bromide and an alkoxy dichlorophosphine frequently a mixture of products is obtained, such as in this case an alkane phosphonyl dichloride and/or an alkane phosphonyl bromide chloride. In order to obtain a phosphonyl dichloride exclusively, an alkyl chloride should be reacted with the alkoxy dichlorophosphine in preference to an alkyl bromide. Reaction between an alkyl iodide and an alkoxy dichloro- or dibromophosphine leads only to the production of the corresponding organic phosphonyl dichloride or dibromide. However, where mixed products are desired, the starting materials will contain different halogen atoms or different organic radicals or both.

The process of this invention may be conducted with or without a catalyst, as desired. When using the alkyl iodides and bromides, satisfactory yields of product are obtained when the reaction is conducted in the absence of a catalyst. Although a catalyst may be employed when using the alkyl iodides and bromides, its presence does not appreciably enhance the yield of product. On the other hand, the more stable alkyl halides, namely, the alkyl chlorides and fluorides lead to better yields of product when a catalyst is present in the reaction mixture, but a catalyst is not necessary if moderate yields may be tolerated. The most effective catalysts have been found to be those of the metal halide type and are selected from the group consisting of Friedel-Crafts catalysts and a metal iodide. Typical examples of suitable Friedel-Crafts catalysts are anhydrous ferric chloride, aluminum chloride and zinc chloride. The metal iodides which may be employed are exemplified by the following: nickel iodide, zinc iodide, cobalt iodide, manganese iodide, sodium iodide, etc. Mixtures of the various catalysts may be used without departing from the scope of this invention. Generally the mol ratio of catalyst to alkoxy dihalophosphine reactant varies between about 0.005 and about 0.30 and preferably between about 0.01 and about 0.25.

The presently described process is operative at temperatures which vary between about 125° C. and about 325° C., the preferred temperature range for any one reaction depending upon whether or not the reaction is conducted in the vapor phase or in the liquid phase, and upon whether or not a catalyst is employed. Autogenous pressures are usually employed in liquid phase operations. However, the pressure may be any pressure between about 1 atmosphere and about 1100 pounds per square inch gage, being either above or below the vapor pressure of the reaction mixture.

In one embodiment of this invention the reaction is conducted in the vapor phase by passing a gaseous mixture of the alkoxy dihalophosphine and alkyl halide reactants through a hot tube at temperatures which are preferably between about 250° C.. and about 300° C. for a contact time of about one to five minutes. Of the various alkyl halides the alkyl iodides lead to higher yields of product than either the corresponding fluorides, chlorides, or bromides when the process of this invention is effected in the vapor phase.

In a more preferable embodiment of this invention, however, the reaction is carried out under autogenous conditions of pressure. The preferred temperature range at elevated pressures is a temperature between about 150° C. and about 275° C. When a catalyst of the Friedel-Crafts type is used the reaction proceeds satisfactorily at temperatures as low as 150° C. whereas in the absence of catalysts the preferable lowest temperature is about 175° C. The time of reaction under liquid phase conditions may vary over relatively wide limits such as between about 10 minutes and about 20 hours but the preferable reaction time has been found to be between about one and about 10 hours.

The mole ratio of alkyl halide to alkoxy dihalophosphine reactant can vary over a wide range, such as between about 0.1 and about 8, but preferably between about 0.9 and about 6. When using an alyl iodide containing the same alkyl radical as the alkoxy dihalophosphine reactant the reaction proceeds to give the corresponding alkane phosphonyl dihalide when its mole ratio in reference to the phosphorus-containing reactant is as low as 0.1 but the yield of product is considerably lower than when at least equimolar quantities of such reactants are used. In the presence of such a dearth of alkyl iodide it is postulated that the phosphorus atom is being alkylated by the alkyl group of both the alkyl iodide and alkoxy dihalophosphine. When either an alkyl chloride, bromide, or fluoride is used generally the best yields of product are obtained when such a reactant is present in molar excess, between about 1.5 and about 6 moles per mole of alkoxy dihalophosphine being preferred. A large excess of alkyl halide is particularly desirable when the alkyl halide employed is a gas under operating conditions of temperature and pressure.

The process of the invention is effected under autogenous conditions of pressure by introducing the individual reactants either separately or together into the reaction zone which is preferably a steel bomb. Upon completion of the reaction the products are purified by conventional methods, such as fractional distillation of liquids, and crystallization of solid products. The identification of the produces is achieved by conventional methods, such as by chemical analysis for percentage composition, mass spectrometer analysis, and determination of physical constants and infrared absorption analysis.

Illustrative Equations 2 and 3 for the production of methane phosphonyl dichloride and isopropane phosphonyl dichloride respectively are cited as typical specific examples and are not to be construed as limiting the scope of the present invention.

(2)
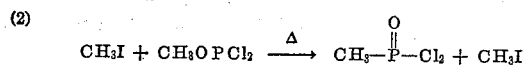

(3)
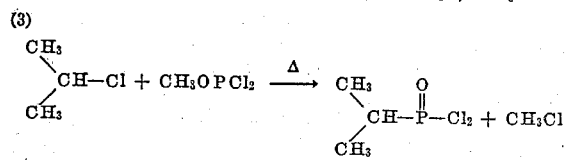

The phosphonyl halide product may be hydrolyzed by conventional methods known to those skilled in the art to the phosphonic acids which in turn may be converted to various phosphonic acid esters and amides by conventional methods, or the phosphonyl halides may be converted directly to their corresponding acid derivatives by conventional methods.

The reaction may be carried out in continuous or batchwise systems without departing from the scope of this invention. The reaction is effected under anhydrous conditions and may be effected in the presence of anhydrous liquid diluents, such as benzene, nitro benzene, toluene and hexane in which the reactants are dissolved or are dispersed by mechanical agitation or emulsifying agents. When inert diluents are used, the diluent comprises between about 25 and about 75 volume percent of the reaction mass.

The theoretical and typical reaction mechanism advanced in explaining the invention should not be construed as unnecessarily limiting thereto and may not be the only explanation for the reactions and products produced. It is essential to the process to effect the reaction at a temperature of at least 125° C. under substantially anhydrous conditions. The presence of water hydrolyzes the alkoxy dihalophosphine to the corresponding acid which does not react with the organic halide to produce the desired product of this invention. Temperatures below 125° C. result in such a slow reaction that no observable yield of product is obtained.

It is to be understood that the procedures employed for the isolation of the desired products are varied in accordance with the physical nature of the products and that the temperature of reaction, molar quantity of reactants, and type of catalyst to be preferred in any instance will depend upon the raw materials employed and the products desired.

The following examples are offered as a better understanding of the present invention and were conducted under substantially anhydrous conditions but they are not to be construed as unnecessarily limiting the present invention.

EXAMPLE 1

The following reaction was conducted in the vapor phase by passing 45.2 grams of a gaseous mixture containing 1 mole of methoxy dichlorophosphine and 1.6 moles of methyl iodide through a heated tube, the temperature of which fluctuated between about 260° C. and about 275° C., for a contact time of about 4 minutes. The gases were then condensed and the resulting liquid product distilled to yield besides lower boiling fractions, two impure fractions with the following boiling points: (1) 125–155° C. and (2) 155–185° C. Infrared analysis of these two fractions showed the main component of each to be methane phosphonyl dichloride.

EXAMPLES 2–8

Details of Examples 2 through 8 are presented in the accompanying Table I. Each of the runs was carried out under autogenous conditions of pressure by charging a 200 ml. steel pressure bomb with 0.4 mole (38 ml.) of methoxy dichlorophosphine, the indicated amount of alkyl halide, and catalyst when employed. The bomb in each case was closed, placed in a reciprocating shaker and heated at a specific temperature for a period of time as indicated in Table I. Each bomb was then cooled and vented to atmospheric pressure. The total contents of each bomb was then tranferred to a distilling flask and heated at atmospheric pressure until no more liquid was distilled overhead and collected. The liquid consisted of impure product and some unreacted starting material.

When an iodine containing catalyst is used, free iodine is formed during the course of the reaction. In such a case, as in Examples 6 and 7, the free iodine was removed by diluting the crude reaction mixture with purified chloroform, shaking with mercury followed by filtration of the mixture to remove the mercury iodide salts. The crude liquid is further purified by fractional distillation at atmospheric pressure; the boiling point ranges of the fractions containing the organic phosphonyl dihalide product obtained in Examples 2 through 8 are given in Table I. Either infrared analysis or mass spectrometer analysis, and/or percent composition analysis further identified the main component of each fraction to be the organic phosphonyl dihalide specified in the table. In each case a purer product could be obtained by efficient means of fractional distillation.

The product obtained in Example 8 was shown to contain 40.9% chlorine and 19.05% bromine indicating it to be a mixture consisting of 42.3% of methane phosphonyl bromide chloride was 57.7% of methane phosphonyl dichloride.

Table I

| Example | Alkyl Halide | Moles | Catalyst | Moles | Temp., °C. | Hours | B.P., °C./1 atmo. | $R-\overset{O}{\underset{\|}{P}}-X_2$ Product |
|---|---|---|---|---|---|---|---|---|
| 2 | $CH_3I$ | 0.04 | | | 200 | 7 | 155–185 | $CH_3-\overset{O}{\underset{\|}{P}}-Cl_2$ |
| 3 | $CH_3I$ | 0.4 | $FeCl_3$ | 0.008 | 150 | 7.3 | 160–180 | $CH_3-\overset{O}{\underset{\|}{P}}-Cl_2$ |
| 4 | $CH_3Cl$ | 1.58 | | | 250 | 7.5 | 160–185 | $CH_3-\overset{O}{\underset{\|}{P}}-Cl_2$ |
| 5 | $CH_3Cl$ | 1.74 | $FeCl_3$ | 0.008 | 250 | 7.0 | 160–185 | $CH_3-\overset{O}{\underset{\|}{P}}-Cl_2$ |
| 6 | $CH_3Cl$ | 2.05 | $NiI_2$ | 0.08 | 250 | 7.0 | 140–161 | $CH_3-\overset{O}{\underset{\|}{P}}-Cl_2$ |
| 7 | $CH_3Cl$ | 2.06 | $NiI_2$ / $FeCl_3$ | 0.08 / 0.008 | 250 | 7 | 140–170 | $CH_3-\overset{O}{\underset{\|}{P}}-Cl_2$ |
| 8 | $CH_3Br$ | 1.73 | | | 250 | 7.5 | 155–175 | $CH_3-\overset{O}{\underset{\|}{P}}\overset{Cl}{\underset{Br}{}}$ |

EXAMPLE 9

A 200 ml. steel pressure bomb was charged with 0.4 mole (39 ml.) of carbon tetrachloride, 0.4 mole of methoxy dichlorophosphine and 0.008 mole (1.3 grams) of anhydrous ferric chloride. The reaction was conducted under autogenous conditions of pressure, as described above for Examples 2 through 8, at a temperature of 250° C. for a residence time of 7.0 hours. A solid product was produced which was continuously extracted with carbon tetrachloride. As the carbon tetrachloride extract cooled yellow crystals formed which were quite unstable in the atmosphere. The yellow solid was dried rapidly and was shown to contain 57.0% chlorine and 11.7% phosphorus and was considered to consist chiefly of trichloromethane phosphonyl dichloride,

Theoretical: Percent Cl, 75.1; percent P, 13.1.

Among the other organic phosphonyl dihalides which can be produced in accordance with the foregoing description and examples are: ethane phosphonyl dichloride, isopropane phosphonyl dibromide, tertiary-butane phosphonyl dichloride, 2-chloroethane phosphonyl dichloride, benzyl phosphonyl dibromide, α,α-dichlorobenzyl phosphonyl dichloride and cyclohexane phosphonyl dichloride.

Having described my invention, I claim:

1. A process for producing an organic phosphonyl dihalide which comprises interacting an organic halide having only a continuous carbon skeleton containing not more than 10 carbon atoms and an alkoxy dihalophosphine having not more than 10 carbon atoms under substantially anhydrous conditions at a temperature of at least 125° C. to produce an organic phosphonyl dihalide.

2. A process for the production of an organic phosphonyl dihalide which comprises interacting an organic halide having only a continuous carbon skeleton containing not more than 10 carbon atoms and selected from the group consisting of the unsubstituted alkyl and cycloalkyl halides and the substituted alkyl and cycloalkyl halides substituted with at least one substituent selected from the group consisting of the halogens and aryl group; and an alkoxy dihalophosphine having only a continuous carbon skeleton of not more than 10 carbon atoms under anhydrous conditions at a temperature between about 125° C. and 325° C. to produce an organic phosphonyl dihalide in which the organic radical linked to phosphorus contains no more than 10 carbon atoms, the carbon atoms being arranged in a continuous carbon chain.

3. The process of claim 2 in which said organic halide is methyl bromide.

4. The process of claim 2 in which said organic halide is methyl chloride.

5. The process of claim 2 in which said organic halide is methyl iodide.

6. The process of claim 2 in which said organic halide is carbon tetrachloride.

7. The process of claim 2 in which said organic halide is allyl chloride.

8. The process of claim 2 in which said alkoxy dihalophosphine is methoxy dichlorophosphine.

9. The process of claim 2 in which said alkoxy dihalophosphine is methoxy difluorophosphine.

10. The process of claim 2 in which said alkoxy dihalophosphine is ethoxy dichlorophosphine.

11. The process of claim 2 in which said alkoxy dihalophosphine is ethoxy difluorophosphine.

12. The process of claim 2 in which said alkoxy dihalophosphine is propoxy dichlorophosphine.

13. A process for the production of methane phosphonyl dichloride which comprises reacting methoxy dichlorophosphine and methyl iodide under anhydrous conditions and at a temperature between about 125° C. and about 325° C. to produce methane phosphonyl dichloride, and recovering methane phosphonyl dichloride thus produced as a product of the process.

14. The process of claim 13 in which the reaction is effected in the vapor phase at a temperature between about 250° C. and about 300° C.

15. The process of claim 13 in which the reaction is effected under autogenous conditions of pressure at a temperature between about 150° C. and about 275° C.

16. The process of claim 13 in which the reaction is effected in the presence of anhydrous ferric chloride as catalyst.

17. A process for the production of methane phosphonyl dihalide which comprises reacting methoxy dichlorophosphine and methyl bromide under anhydrous conditions and under autogenous conditions of pressure at a temperature between about 150° C. and about 275° C. to produce methane phosphonyl dihalide, and recovering the methane phosphonyl dihalide thus produced as a product of the process.

18. A process for the production of methane phosphonyl dichloride which comprises reacting methoxy dichlorophosphine and methyl chloride under anhydrous conditions at a temperature between about 150° C. and about 275° C. to produce methane phosphonyl dichloride, and recovering methane phosphonyl dichloride thus produced as a product of the process.

19. The process of claim 18 in which the reaction is effected in the presence of ferric chloride as catalyst.

20. The process of claim 18 in which the reaction is effected in the presence of nickel iodide as catalyst.

21. A process for the production of trichloromethane phosphonyl dichloride which comprises reacting methoxy dichlorophosphine and carbon tetrachloride under anhydrous conditions at a temperature between about 150° C. and about 275° C. to produce trichloromethane phosphonyl dichloride, and recovering trichloromethane phosphonyl dichloride thus produced as a product of the process.

22. The process of claim 21 in which the reaction is effected in the presence of ferric chloride as catalyst.

No references cited.